(12) United States Patent
Lee et al.

(10) Patent No.: US 6,849,326 B1
(45) Date of Patent: Feb. 1, 2005

(54) NIOBIUM ALLOY SEEDLAYER FOR MAGNETIC RECORDING MEDIA

(75) Inventors: Li-Lien Lee, San Jose, CA (US); Samuel D. Harkness, San Francisco, CA (US); Rajiv Y. Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 23 days.

(21) Appl. No.: 09/964,690

(22) Filed: Sep. 28, 2001

Related U.S. Application Data (60) Provisional application No. 60/239,550, filed on Oct. 10, 2000.

(51) Int. Cl.$^7$ .............................. G11B 5/66; G11B 5/70
(52) U.S. Cl. ................................ 428/336; 428/694 TS; 428/900; 427/128; 427/130
(58) Field of Search .......................... 428/694 TS, 900, 428/332, 336; 427/128, 130

(56) References Cited

U.S. PATENT DOCUMENTS

| | | |
|---|---|---|
| 4,411,963 A | 10/1983 | Aine |
| 4,430,387 A | 2/1984 | Nakagawa et al. |
| 4,657,824 A | 4/1987 | Howard |
| 4,929,514 A | 5/1990 | Natarajan et al. |
| 5,112,699 A | 5/1992 | Chang |
| 5,480,733 A | 1/1996 | Okumura et al. |
| 5,681,635 A | 10/1997 | Nelson et al. |
| 5,759,682 A | 6/1998 | Ouchi et al. |
| 5,811,182 A | 9/1998 | Weir et al. |
| 5,851,628 A * | 12/1998 | Ohkubo et al. .............. 428/141 |
| 5,961,792 A | 10/1999 | Nelson et al. |
| 5,981,018 A | 11/1999 | Lai et al. |
| 6,103,367 A | 8/2000 | Weir et al. |
| 6,110,557 A | 8/2000 | Weir et al. |
| 6,120,890 A | 9/2000 | Chen et al. |
| 6,132,892 A | 10/2000 | Yoshikawa et al. |
| 6,174,582 B1 | 1/2001 | Bian et al. |
| 6,383,667 B1 * | 5/2002 | Futamoto et al. ...... 428/694 TS |
| 6,558,811 B1 * | 5/2003 | Wong ......................... 428/611 |
| 6,607,849 B2 * | 8/2003 | Futamoto et al. .... 428/694 TM |

FOREIGN PATENT DOCUMENTS

| | | |
|---|---|---|
| JP | 59-178625 | 10/1984 |
| JP | 60-201524 | 10/1985 |
| JP | 62-6426 | 1/1987 |
| JP | 63-317922 | 12/1988 |

* cited by examiner

*Primary Examiner*—Holly Rickman
(74) *Attorney, Agent, or Firm*—Morrison & Foerster LLP (57) ABSTRACT

A magnetic recording medium containing a niobium-containing seedlayer having a thickness from about 1 Å to about 40 Å, and a method of making the same. The seedlayer provides a recording media with relatively high remanent coercivity and relatively high signal to medium noise ratio.

17 Claims, 6 Drawing Sheets

NIOBIUM ALLOY SEEDLAYER FOR MAGNETIC RECORDING MEDIA

RELATED APPLICATIONS

This application claims priority from Provisional Application Ser. No. 60/239,550, filed Oct. 10, 2000, entitled "Nb Alloy Seedlayer for Magnetic Recording Media," the entire disclosure of which is incorporated herein by reference.

FIELD OF INVENTION

This invention relates to magnetic recording media, such as thin film magnetic recording disks, and to a method of manufacturing the media The invention has particular applicability to high areal density magnetic recording media having thin films for longitudinal magnetic recording media.

BACKGROUND

The increase demand for higher areal recording densities impose increasingly greater demands on longitudinal magnetic recording media in terms of remanent coercivity (Hcr), magnetic remanence (Mr), coercivity squareness (S*), medium noise, i.e., signal-to-medium noise ratio (SMNR), and narrow track recording performance. It is extremely difficult to produce magnetic recording media that satisfies all or most of these requirements.

Longitudinal recording media is structured as a layered material of metal films deposited on a substrate. The recording media typically has one or more underlayers, such as a chromium (Cr) or a Cr alloy film, one or more magnetic layers, such as a cobalt (Co) alloy, and a protective overcoat. The Co alloy magnetic layer typically contains polycrystallites grown on a polycrystal Cr or Cr alloy underlayer. The underlayer, magnetic layer, and protective overcoat are typically deposited by physical vapor deposition techniques (sputtering).

A magnetic material is composed of a number of submicroscopic regions called domains. Each domain contains parallel atomic magnetic moments but the directions of magnetization of different domains are not necessarily parallel. In the absence of an applied magnetic field, adjacent domains may be oriented randomly in any number of several directions, often called the directions of easy magnetization, which depend on the geometry of the crystal. In a relatively unmagnetized material, the magnetization of each domain is essentially cancelled by an equal and opposite magnetic field produced by an adjacent domain. If a magnetic field is applied many of the domains rotate and align parallel to the applied field. Also, the domains most nearly parallel to the direction of the applied field grow in size at the expense of the others. This is called boundary displacement of the domains or domain growth. These aligned domains further increase the local magnetic field causing more domains to rotate and align parallel to the applied field. When the material reaches the point of saturation magnetization, no further domain growth occurs, even if the magnitude of the external magnetic field is increased.

Magnetic properties, such as remanent coercivity (Hcr), remanent magnetization (Mr) and coercive squareness (S*), which are important to the recording performance of the recording media depends in part on the microstructure of the Co alloy magnetic film for a given Co alloy composition. For longitudinal magnetic recording media, the desired crystalline structure of the Co and Co alloys is hexagonal close packed (HCP) with uniaxial crystalline anisotropy and a magnetization easy direction along the c-axis in the plane of the film. The better the in-plane c-axis crystallographic texture, the higher the remanent coercivity of the Co-alloy magnetic film.

The grain size of the magnetic film also effects the magnetic performance of recording media. Remanent coercivity increases with an increase in grain size, however, the larger the grain size the higher the medium noise level of the recording media, that is, the lower the SMNR. Thus, there exists a need to achieve high remanent coercivities without the increase in medium noise associated with relatively large grain size. To achieve a low noise recording medium, the Co alloy magnetic layer should have fairly uniform and small grain size with grain boundaries that can magnetically isolate neighboring grains. This kind of microstructure and crystallographic texture is normally achieved by manipulating the deposition process, by grooving the substrate surface, or most often by the proper use of a seedlayer and/or one or more underlayers with a preferred crystallographic orientation.

The linear recording density can be increased by increasing the remanent coercivity and/or by decreasing the medium noise of the recording medium. This can be accomplished by producing a magnetic layer with fine, magnetically non-coupled grains. Medium noise in thin films is a dominant factor restricting increased recording densities, and is attributed in part to inhomogeneous grain size and intergranular exchange coupling. Accordingly, in order to increase linear density, medium noise must be minimized by suitable microstructure control.

The manufacture of longitudinal magnetic recording media can at times include applying a seedlayer between the substrate and the underlayer. A seedlayer provides nucleation of a particular crystallographic texture of the underlayer as well as to subsequent layers, including the magnetic layer.

In co-pending U.S. patent application Ser. No. 09/152,326 filed on Sep. 14, 1998, a magnetic recording medium is disclosed comprising a surface oxidized NiAl seedlayer, and sequentially deposited thereon a Cr-containing underlayer, a CoCrTa intermediate layer and a CoCrPtTa magnetic layer. "Seedlayer Induced (002) Crystallographic Texture in NiAl Underlayers," L.-L. Lee, D. E. Laughlin and D. N. Lambeth, *J. Appl. Phys.*, 79 (8), pp. 49024904 (1996), discloses a MgO seedlayer. "FeAl Underlayers for CoCrPt Thin Film Media," L.-L. Lee, D. E. Laughlin and D. N. Lambeth, *J. Appl. Phys.*, 81 (8), pp. 4366–4368 (1997), first reported an FeAl underlayer having a B2 structure.

U.S. Pat. No. 6,174,582 discloses a seedlayer containing a refractory metal that promotes a (200) orientation in the Cr underlayer and a (1 1 2̄ 0) orientation in the magnetic layer. The refractory metal can be selected from tantalum, niobium, vanadium, tungsten, molybdenum, or chromium. Although the thickness of the seedlayer was stated as not critical, the seedlayer should have a preferred thickness of about 50 Å to 300 Å, and a more preferred thickness of about 100 Å to 300 Å.

In order to store as much digital information as possible on a recording medium there is a continuing need for improved areal density magnetic recording media exhibiting high remanent coercivity and high SMNR. The need for lighter, smaller and better performing computers with greater storage density demands higher density recording media. The present invention satisfies these demands with a longitudinal magnetic recording media having high remanent coercivity and low medium noise.

SUMMARY OF THE INVENTION

The invention provides a magnetic recording medium for high areal recording density exhibiting a relatively high remanent coercivity, and/or a relatively high SMNR. One way of achieving this goal is to produce a magnetic recording medium having a seedlayer that can effect the microstructure of an underlayer and/or magnetic layer. The magnetic recording medium, includes a substrate, a niobium-containing seedlayer having a thickness selected from about 1 Å to about 40 Å, from about 1 Å to about 35 Å, from about 1 Å to about 30 Å, or from about 1 Å to about 20 Å, and a magnetic layer.

The niobium-containing seedlayer contains a material containing at least 80 atomic percent niobium, a material containing at least 50 atomic percent niobium, or a material containing at least 20 atomic percent niobium. In one embodiment, the niobium containing seedlayer includes a niobium-nitride based material, $NbN_m$, wherein m is a number selected from from about 0.05 to about 2, or from about 0.05 to about 1.

In another embodiment the niobium-containing seedlayer can contain a metal selected from boron, titanium, vanadium, chromium, zirconium, molybdenum, ruthenium, or tantalum. If the niobium containing seedlayer contains one or more of these metals, it is preferred that the niobium containing seedlayer have a niobium:metal ratio from about 1:2 to about 20:1.

The magnetic recording medium of the invention can be made by depositing a niobium-containing seedlayer on a substrate, wherein the seedlayer has a thickness selected from about 1 Å to about 40 Å, from about 1 Å to about 35 Å, from about 1 Å to about 30 Å, or from about 1 Å to about 20 Å, and depositing a magnetic layer. The recording medium is also likely to contain one or more underlayers disposed between the seedlayer and magnetic layer. The niobium-containing seedlayer is preferably deposited in an environment comprising a gas selected from nitrogen, argon, and mixtures thereof. More preferably, the deposition environment will contain from 15% to 60% by volume nitrogen.

In this invention, "means for maximizing the remanent coercivity of the recording medium by providing a niobium-containing seedlayer" is a niobium-containing seedlayer that produces a maximum coercivity of the recording medium at a seedlayer thickness of 60 Å or less, wherein preferably, the seedlayer thickness is about 1 Å to about 40 Å.

Additional advantages of this invention would become readily apparent to those skilled in this art from the following detailed description, wherein only the preferred embodiments of this invention are shown and described, simply by way of illustration of the best mode contemplated for carrying out this invention. As would be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

This invention will be better understood by reference to the Detailed Description taken together with the attached drawings, wherein.

DETAILED DESCRIPTION

This invention is directed to magnetic recording media suitable for high areal recording density exhibiting relatively high remanent coercivity and relatively high SMNR. This recording media includes a niobium-containing seedlayer and one or more layers which includes a magnetic layer. The niobium-containing seedlayer of the invention has a positive effect on remanent coercivity and/or SMNR relative to recording media prepared without such a seedlayer. The seedlayer will have a thickness selected from about 1 Å to about 40 Å, from about 1 Å to about 35 Å, or from about 1 Å to about 20 Å.

In one embodiment, the sequential stacking arrangement of the recording media can include a substrate, a niobium-containing seedlayer, an underlayer, and a magnetic layer. Other embodiments can also include one or more of the following layers; a subseedlayer, a protective overcoat layer, and an intermediate layer that is disposed between the underlayer and magnetic layer.

Figure 1:
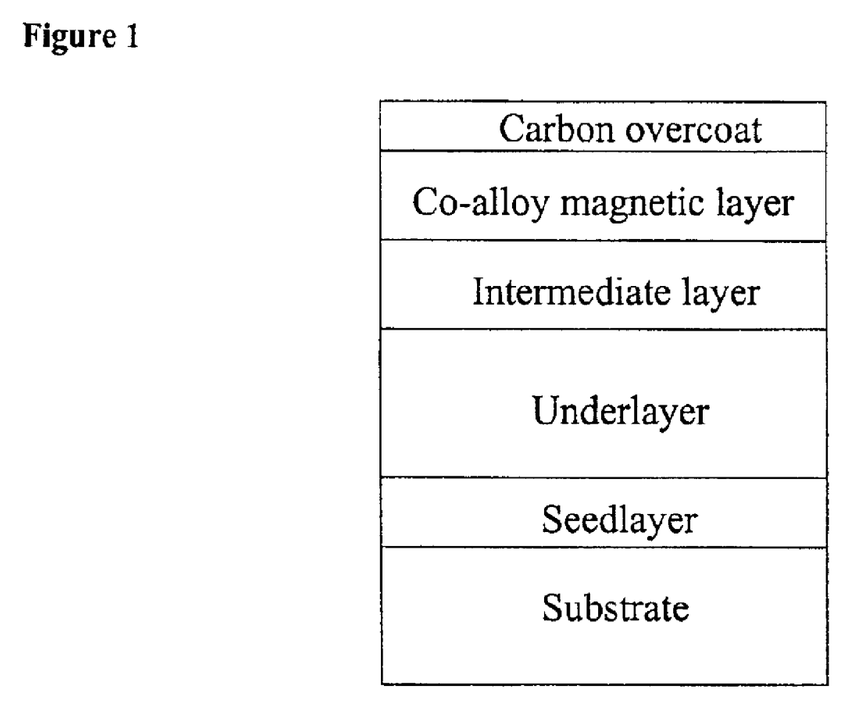
FIG. 1 is a schematic representation of the film structure for one embodiment of the invention.

FIG. 1 shows one embodiment of the layered laminate structure of the invention. The substrates that can be used include glass, glass-ceramic, NiP/aluminum, metal alloys, plastic/polymer material, ceramic, glass-polymer, composite materials or other non-magnetic materials. Preferably, the underlayer will contain a material of selected from Cr, Cr alloy, or NiAl. The intermediate layer is optional and can be a Co-alloy or other HCP- or BCC-structured alloy. The magnetic layer can be comprised of a single or a multi-layered Co alloy.

The microstructure of the seedlayer will in many instances have an influence on the microstructure of the underlayer and/or the magnetic layer. It is desired that the niobium-containing seedlayer be capable of influencing the microstructure of the underlayer, the optional intermediate layer, and/or the magnetic layer. The niobium-containing layer enhances the (002) lamellar texture in underlayers, particularly in chromium or chromium-alloy underlayers, as well as enhances the (1 1 $\bar{2}$ 0) lamellar texture in magnetic alloy magnetic layers, particularly in Co alloy magnetic layers. In particular, the niobium-containing seedlayer helps to align the c-axis of the magnetic layer predominantly parallel to the film surface. This provides for an improvement in the in-plane magnetic properties such as Hcr and S* of the medium, which results in a relatively high SMNR. The niobium-containing seedlayer provides a recording medium with a remanent coercivity value selected from the group consisting of from about 3200 Oe to about 6000 Oe, from about 3600 Oe to about 5400 Oe, and from about 3800 Oe to about 5000 Oe. The recording medium will also have a SMNR value selected from the group consisting of about 100 dB or greater, of about 11 dB or greater, and of about 12 dB or greater. Desirably, the lattice constant and the crystal plane of the Cr alloy underlayer and the HCP structured layer above will closely match. As a result, the magnetic layer will grow in a close-packed hexagonal structure with a (1 1 2̄ 0) crystallographic orientation predominantly parallel to the film plane. As a result, the magnetic easy axis, i.e., the c-axis, lies predominantly in the film plane.

It is also desirable for the niobium-containing seedlayer to positively effect the distribution of grain size and grain shape of the later deposited layers. Small grain size provides more optimal recording properties of the longitudinal magnetic recording medium.

The niobium-containing seedlayer will comprise a niobium-containing material selected from a material containing at least 80 atomic percent niobium, a material containing at least 50 atomic percent niobium, or a material containing at least 20 atomic percent niobium. The remaining portion of the niobium-containing seedlayer can contain nitrogen and/or a metal selected from tantalum, vanadium, chromium, molybdenum, titanium, ruthenium, boron, zirconium, or a mixture of each thereof. If the seedlayer is a niobium metal alloy, the niobium containing seedlayer will preferably contain a niobium:metal ratio from about 1:2 to about 20:1.

In one embodiment, the niobium-containing seedlayer will contain a niobium-nitride based material, $NbN_m$, wherein m is from about 0.05 to about 2, preferably from about 0.05 to about 1. The optimal amount of nitrogen in $NbN_m$ will depend in-part on the thickness of the $NbN_m$ seedlayer. Generally, the thicker the $NbN_m$ seedlayer in the recording media, the higher the nitrogen content is needed for optimal recording performance. Niobium-nitride based seedlayers with a relatively high nitrogen content can be obtained by increasing the nitrogen content of the deposition environment.

The thickness of the niobium-containing seedlayer can also effect the performance of the recording media. In one embodiment, the niobium containing seedlayer will have a thickness from about 1 Å to about 40 Å. In another embodiment, the niobium containing seedlayer will have a thickness from about 1 Å to about 35 Å. In another embodiment, the niobium containing seedlayer will have a thickness from about 1 Å to about 30 Å. In another embodiment, the niobium containing seedlayer will have a thickness from about 1 Å to about 20 Å.

The recording medium of the invention will contain a substrate, a niobium-containing seedlayer from about 1 Å to about 40 Å in thickness, and a magnetic layer. The seedlayer is disposed between the substrate and the magnetic layer. Although seedlayers with a thickness greater than 40 Å can also be used to provide recording media with optimal recording properties, e.g., high remanent coercivity, it is preferred that the seedlayer have a thickness of about 40 Å or less. Typically, the recording media of the invention will have a maximum remanent coercivity if the seedlayer is about 60 Å or less.

The recording media can also contain a subseedlayer that is preferably physically sputtered on the substrate. For example, a NiAl subseedlayer can be deposited on a NiP-plated aluminum substrate. If a subseedlayer is applied, the niobium-containing seedlayer is then deposited on the subseedlayer.

Preferably, the recording media will have at least one underlayer with an A2-crystalline structure or a B2-ordered crystalline structure disposed between the seedlayer and the magnetic layer. The A2 phase is preferably Cr or a Cr alloy, such as CrV. The B2 phase is selected from the group consisting of NiAl, AlCo, FeAl, FeTi, CoFe, CoTi, CoHf, CoZr, NiTi, CuBe, CuZn, AlMn, AlRe, AgMg, and $Al_2FeMn_2$, and is most preferably FeAl, CoTi or NiAl.

Underlayers can strongly influence the crystallographic orientation, the grain size and chemical segregation at the Co alloy grain boundaries. Underlayers that have been reported in the literature include Cr, Cr with an additional alloy element, wherein X is selected from the following elements; C, Mg, Al, Si, Ti, V, Co, Ni, Cu, Zr, Nb, Mo, La, Ce, Nd, Gd, Th, Dy, Er, Ta, and W. While there would appear to be a number of underlayer materials available, in practice, only a few work well enough to meet the demands of the industry. The most often used and the most successful underlayer is Cr or Cr alloyed with manganese, vanadium, titanium, tungsten, or molybdenum.

For high density recording, in-plane orientation of the magnetic layer has been achieved by grain-to-grain epitaxial growth of the hexagonal close packed (HCP) Co alloy layer on a body centered cubic (BCC) Cr underlayer. The polycrystalline Co alloy layer is deposited with its c-axis, the 0002 axis, either parallel to the film plane or with a large component of the c-axis in the film plane. Different Co/Cr epitaxial relationships prevail for different deposition processes. To obtain a good BCC structure, which promotes the formation of the HCP structure, the Cr underlayer should be thicker than about 25 Å. Conventional Co alloy magnetic layers are CoCrTa, CoCrPtB, CoCrPt, CoCrPtTaB, CoCrPtTaNb and CoNiCr.

In one embodiment, a portion of the underlayer could be oxidized by being sputter deposited with Ar and oxygen to promote a decrease in grain size. The term "a portion of" is defined herein to include all or part of a layer. Therefore, the entire layer, i.e., extending from one end of the layer to the opposite end of the layer may be in an oxidized form. The underlayer could be oxidized by a reactive sputtering technique in an argon-oxygen environment. Suitable oxidizing atmospheres, at a suitable temperature, e.g., about 100° C. to about 300° C., contain about 1 to about 100, preferably about 5 to about 80, volume percent of oxygen ($O_2$), the remainder being an inert gas, such as argon (Ar), in particular, about 1 to about 50 volume percent oxygen, such as about 20 percent by volume oxygen. The degree of oxidation can be such that the amount of oxygen in the top 50 Å of the oxidized layer, after in situ sputter removal of the 40 Å surface layer, is about 15 atomic percent to about 50 atomic percent, such as about 20 atomic percent to about 30 atomic percent.

In a preferred embodiment, the amount of oxygen in the argon-oxygen environment is from 1% to 80% by volume oxygen, preferably 1% to 50% by volume oxygen, more preferably 1% to 25% by volume oxygen. The amount of oxygen in the oxidized portion of the seedlayer may vary from about 0.0001 atomic percent to 20 atomic percent, preferably from about 0.001 atomic percent to 10 atomic percent, and most preferably 0.01 atomic percent to 0.9 atomic percent.

The recording media can also contain one or more intermediate layers with a thickness from about 1 Å to 40 Å. The intermediate layer is preferably a non-magnetic body-centered cubic (BCC) material, such as Cr and Cr alloy, or a non-magnetic HCP material, such as Ru and CoCrX, wherein X is B, Pt, Ru, Ta, Ti and Mo.

The magnetic layer is deposited with the magnetic easy axis, which is the c axis in an HCP phase, substantially parallel to the plane of the magnetic layer. If multiple magnetic layers are deposited, each layer can be from about 20 Å to about 600 Å thick. Magnetic layers that can be used in the recording media include various magnetic alloys containing B, Cr and Co, such as CoCrB, CoCrPtB, CoCrNiB, CoCrNiPtB, CoCrNiTaB, CoCrNiNbB, CoCrPtTaB, CoCrPtNbB and CoCrPtTaNbB, and other combinations of B, Cr, Co, Pt, Ni, Ta and Nb, in the magnetic layer.

An overlayer, which is thought to prevent corrosion, may be provided adjacent to and preferably in contact with the magnetic layer. The overlayer is about 1 Å to about 50 Å thick and may contain the metals selected from W, Ta, Zr, Ti, Y, Pt, Cr or any combination thereof.

An overcoat may be provided external to the overlayer, so that the overlayer is positioned between the magnetic layer and the overcoat. The overcoat provides a mechanical wear layer and is typically 2.0–30 nm thick. It is preferably made of a ceramic material or diamond-like carbon, such as $SiO_2$, SiC, CN, $ZrO_2$ or C.

An organic lubricant may be disposed on the overcoat. The lubricant is generally 1 nm to 30 nm thick and is preferably a fluoro-chlorocarbon or a perfluoroether. Examples include $CCl_2FCClF_2$, $CF_3(CF_2)_4CF_3$, $CF_3(CF_2)_5CF_3$, $CF_3(CF_2)_0CF_3$, and $CF_3(CF_2)_{16}CF_3$.

In one embodiment, the laminate structure of the recording medium can be described as follows: a glass or glass-ceramic substrate, a niobium-containing seedlayer, a Cr or Cr alloy underlayer, a CoCrPtB magnetic layer, and a protective overcoat.

In another embodiment, a CoCr or CoCr-alloy intermediate layer is deposited on the underlayer. Preferably, the structure of the intermediate layer is HCP. The CoCr-alloy could further contain Mo, Ta, Pt, Ru, Ti, B and Ni in the range of about 0 to about 40 atomic percent, more preferably, about 0.1 to about 7 atomic percent.

The magnetic recording medium has a remanent coercivity of about 2000 Oersted (Oe) to about 10,000 Oe, and an Mrt, which is the product of magnetic remanence (Mr) and the magnetic layer thickness (t), of about 0.2 memu/cm$^2$ to about 2.0 memu/cm$^2$. In a preferred embodiment, the remanent coercivity is about 2500 Oe to about 9000 Oe, more preferably in the range of about 3000 Oe to about 6000 Oe, and most preferably in the range of about 3350 Oe to about 5000 Oe. In a preferred embodiment, the Mrt is about 0.25 memu/cm$^2$ to about 1 memu/cm$^2$, more preferably in the range of about 0.3 memu/cm$^2$ to about 0.7 memu/cm$^2$, and most preferably in the range of about 0.3 memu/cm$^2$ to about 0.6 memu/cm$^2$.

The recording media of the invention were prepared according to the following procedures. The substrates were placed in a vacuum processing system capable of multilayer sputter processing. In its most basic form the processing system includes one or more heating elements, a dc or rf magnetron to sputter the target material, one or more cooling elements, and a carbon overcoat sputtering capability.

The recording media of the invention can be produced in the following manner:

1. Deposit a niobium-containing seedlayer with a thickness from about 1 Å to about 40 Å on a substrate in a deposition environment. If the seedlayer is a niobium nitride based material, the deposition environment will contain nitrogen. The deposition environment can contain from about 2% to about 80% by volume, preferably from about 5% to about 60% by volume, and more preferably from about 5% to about 40% by volume, nitrogen. During this deposition process the substrate is heated to a temperature from about 200° C. to about 400° C., preferably from about 225° C. to about 350° C., more preferably from about 250° C. to about 300° C. The pressure within the deposition chamber during seedlayer formation is from about 0.5 mTorr to about 40 mTorr, preferably from about 1 mTorr to about 20 mTorr.

2. A Cr or Cr alloy underlayer is deposited on the niobium-containing seedlayer at a deposition rate from about 5 Å/s to about 50 Å/s while maintaining a substrate bias from about −50 Volts to about −600 Volts. The deposition environment is preferably an inert environment, e.g., argon pressure, which is maintained at a pressure from about 0.2 mTorr to about 50 mTorr.

3. An optional intermediate layer can be deposited containing similar alloy components as the magnetic layer alloy, but having a relatively higher Cr content (>30 atomic percent) so as to render the material non-magnetic. In most embodiments, the intermediate layer will have a thickness from about 10 Å to about 60 Å. The deposition conditions for this layer can include a deposition rate of about 5 Å/s to about 60 Å/s, a substrate bias of about −50 Volts to about −800 Volts. The deposition environment is preferably an inert environment, e.g., argon pressure, which is maintained at a pressure from about 0.2 mTorr to about 50 mTorr.

4. A Co alloy magnetic layer, preferably a magnetic layer based upon a CoCrPtB, is deposited on the intermediate layer. Deposition conditions include a deposition rate from about 5 Å/s to about 100 Å/s, preferably from about 5 Å/s to about 60 Å/s. A substrate bias from about −50 Volts to about −800 Volts, preferably from about −100 Volts to about −600 Volts. An argon-containing deposition environment at a pressure of from about 0.5 mTorr to about 40 mTorr, more preferably from about 1 mTorr to about 20 mTorr.

5. Following the deposition of the magnetic layer the prepared recording media is cooled to a temperature of about 150° C. An overcoat layer is then applied at a deposition rate of about 10 Å/s.

6. The recording media is removed from the processing system and a 20 Å Z-Tetrol lubricant is applied to the overcoat. The finished surface is buffed, wiped, and burnished. Some of the cleaning/polishing methods that can be used in the invention, include, but are not limited, to any one or more of following methods known to those of ordinary skill in the art; mechanical polishing, chemical polishing, electrochemical polishing, and chemical mechanical polishing.

The invention is illustrated by the following examples. In the example embodiments DC magnetron sputtering was used to deposit all of the layers in the recording media. SMNR was measured using a Guzik 1701 MP spinstand. The background noise and dc-noise were subtracted to leave only the noise coming from the recording media.

The provided examples illustrate the effect of a seedlayer on the magnetic properties of a recording media. The recording media were prepared according to the invention were prepared with the following laminate structure:

EXAMPLE 1

Crystalline glass substrate;

First layer (seedlayer) $NbN_m$;

Second layer (underlayer) $CrW_{10}$;

Third layer (intermediate layer) $CoCr_{37}$;

Fourth layer (magnetic layer) $CoCr_{14}Pt_{14}B_{10}$; and

Fifth layer (overcoat) carbon.

Figure 2:
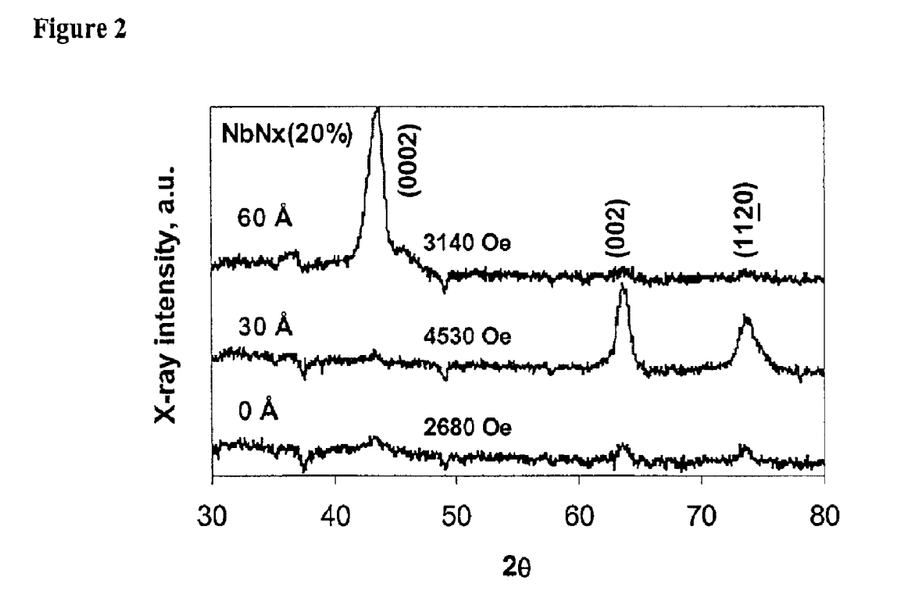
FIG. 2 shows the X-ray diffraction patterns of $CrW_{10}\backslash CoCr_{37}\backslash CoCr_{14}Pt_{10}B_{10}$ films with various thickness of niobium seedlayers.

FIG. 2 shows XRD 2θ scans of $CrW_{10}\backslash CoCr_{37}\backslash CoCr_{14}Pt_{10}B_{10}$ recording media with 0 Å (control), 30 Å and 60 Å thick $NbN_m$, seedlayers. The seedlayers, in the case of the later two samples, respectively, were obtained by physical vapor deposition (sputtering) in a deposition environment containing about 20 volume percent nitrogen and about 80 volume percent argon. The three recording media have identical layer structure except for the stated differences in seedlayers. The magnetic layer thickness for all three media were the same and was selected such that the recording media with the 30 Å $NbN_m$ seedlayer has an Mrt of 0.41 memu/cm$^2$. The maximum remanent coercivity of the control was about 2690 Oe, of the 60 Å sample about 3140 Oe, and of the 30 Å sample about 4530 Oe. As shown, the x-ray data for the recording media with the 30 Å $NbN_m$ seedlayer exhibits a lamellar texture corresponding to a ((1 1 $\bar{2}$ 0)) orientation. This preferred orientation is believed to strongly account for the higher remanent coercivity.

FIG. 2 also shows how the thickness of a $NbN_m$ seedlayer deposited in a 20/80 ($N_2$/Ar) deposition environment can dramatically effect the remanent coercivity of the recording media. The 60 Å $NbN_m$ seedlayer exhibited a relatively small increase in remanent coercivity over that of the control, while the 30 Å $NbN_m$ seedlayer exhibited almost a doubling in remanent coercivity.

Figure 3:
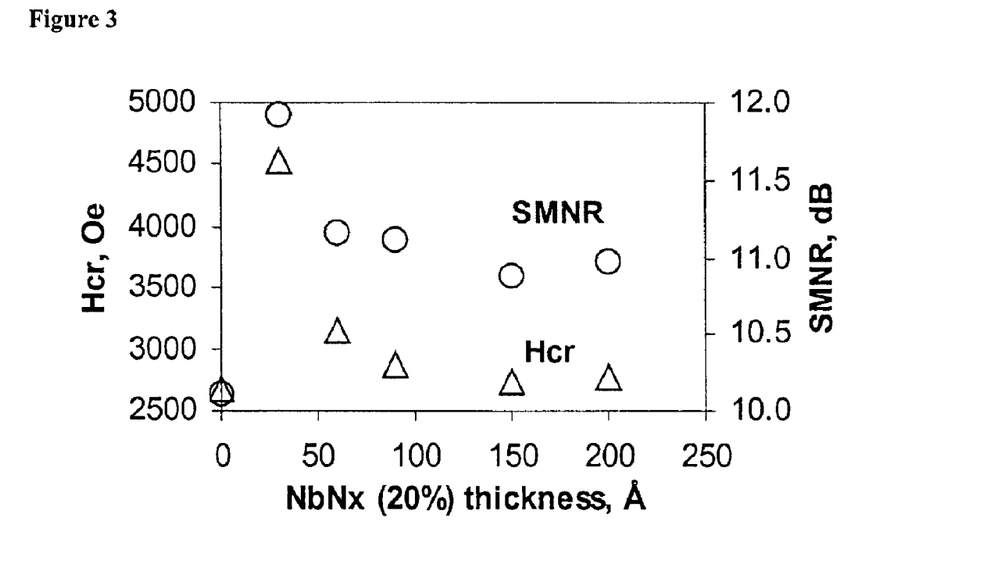
FIG. 3 shows the coercivities and SMNR's of films with various thickness of niobium seedlayers.

The effect of thickness of the $NbN_m$ seedlayer on remanent coercivity and SMNR is shown in FIG. 3. Each of the sample recording media shown in FIG. 3 were prepared in identical deposition environments with identical layered structure except that the $NbN_m$ seedlayers have different thickness as shown by the x-axis. The recording media with the 30 Å $NbN_m$ seedlayer had the highest Hcr and SMNR. The samples with a 60 Å or greater $NbN_m$ seedlayer showed little if any difference in remanent coercivity than the control.

Figure 4:
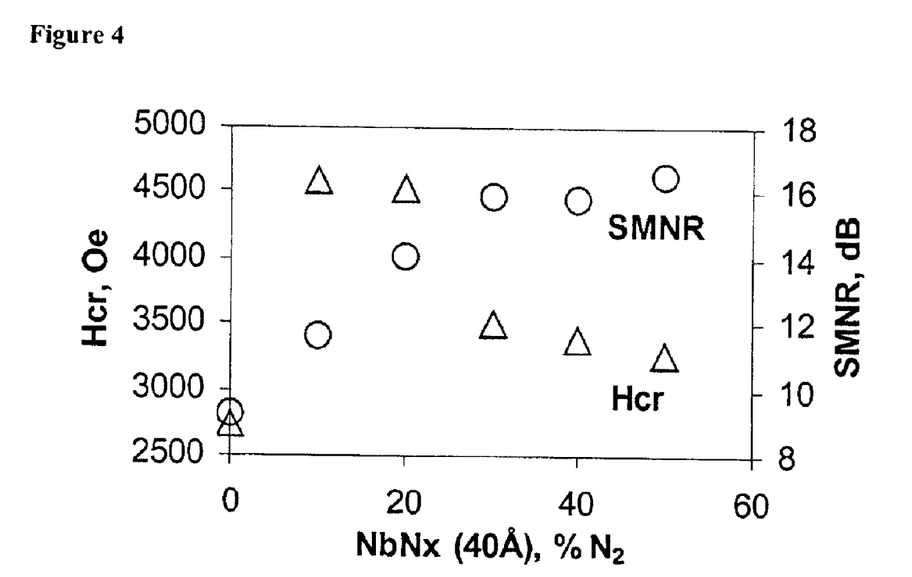
FIG. 4 shows the coercivities and SMNR's of a film with a 40 Å thick niobium-containing seedlayer deposited in the presence of various nitrogen/argon mixtures.

FIG. 4 exhibits remanent coercivities and SMNRs of recording media with nearly identical structure of $NbN_m\backslash CrW_{10}CoCr_{37}\backslash CoCr_{14}Pt_{10}B_{10}$ with 40 Å thick $NbN_m$ seedlayers deposited in different deposition environments. The deposition environments used ranged from 0% by volume nitrogen to 50% by volume nitrogen in argon. The recording media with the $NbN_m$ seedlayer deposited in a deposition environment with a relatively low nitrogen content, i.e., from about 5% to about 25% by volume nitrogen had high remanent coercivities. The remanent coercivities gradually decreased as the nitrogen content of deposition environment exceeded 30% by volume. In contrast, the SMNR for each of the recording media increased with the nitrogen content of the deposition environment. It is believed that recording media deposited in a relatively high nitrogen content deposition environment results in a niobium-containing seedlayer with a relatively high nitrogen content. The seedlayers with the higher nitrogen content seedlayer also exhibits a higher SMNR. Therefore, a recording media with a desired optimal performance can be produced by adjusting the thickness and nitrogen content of the seedlayer.

Figure 5:
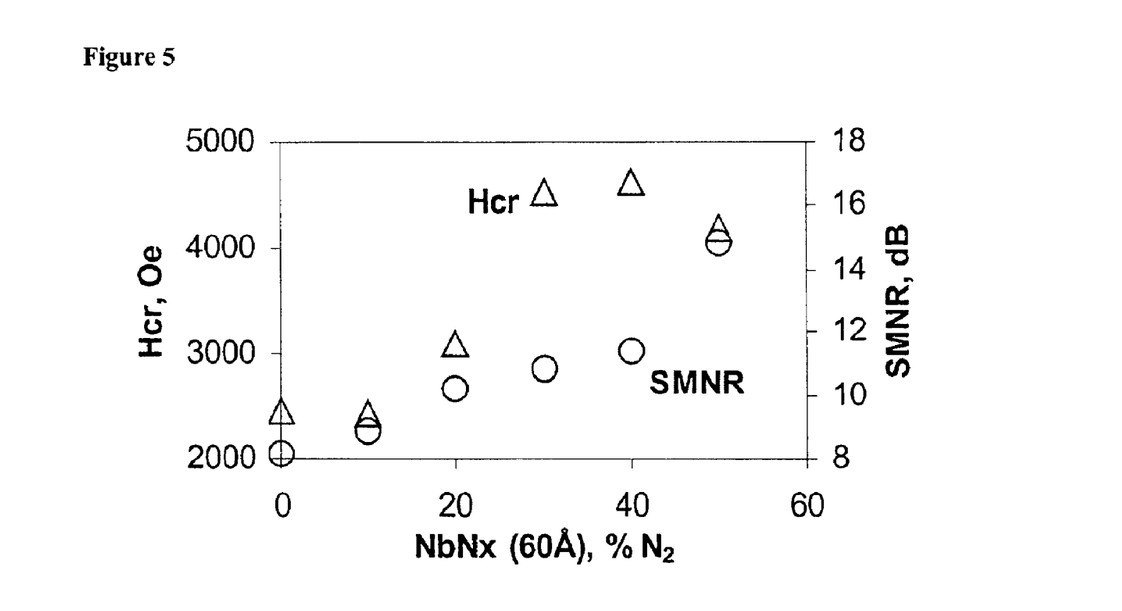
FIG. 5 shows the coercivities and SMNR's of a film with a 60 Å thick niobium-containing seedlayer deposited in the presence of various nitrogen/argon mixtures.

FIG. 5 exhibits remanent coercivities and SMNRs of recording media with nearly identical structure of $NbN_m\backslash CrW_{10}\backslash CoCr_{37}\backslash CoCr_{14}Pt_{10}B_{10}$ with 60 Å thick $NbN_m$ seedlayers deposited in different deposition environments. FIG. 5 suggests that the thicker the $NbN_m$ seedlayer, the higher the nitrogen content of the seedlayer is required for optimal recording performance. In this case, a 60 Å thick film shows more desirable recording performance if deposited in a deposition environment with greater than 20% by volume nitrogen.

Table 1 lists the magnetic properties, Hcr, Mrt and S*, and SMNRs and PW50 of $CrW_{10}\backslash CoCr_{37}\backslash CoCr_{14}Pt_{10}B_{10}$ recording media with 0 Å, 30 Å, and 60 Å thick $NbN_m$ seedlayers, sputtered with 20% $N_2$ and 80% Ar gas mixture, on glass substrates. It shows that the sample with a 30 Å thick NbNx seedlayer has the highest Hcr, SMNR and the narrowest PW50.

TABLE 1

| Sample | Seedlayer | Hcr (Oe) | MrT (memu/cm$^2$) | S* | SMNR (dB) | PW50 ($\mu$inch) |
|---|---|---|---|---|---|---|
| A | no | 2682 | 0.44 | 0.88 | 10.1 | 6.0 |
| B | $NbN_m$, 30Å | 4535 | 0.41 | 0.88 | 11.9 | 5.6 |
| C | $NbN_m$, 60Å | 3143 | 0.34 | 0.50 | 11.2 | 6.4 |

EXAMPLE 2

Crystalline glass substrate;
First layer (seedlayer) $NbW_{40}$;
Second layer (underlayer) $CrW_{10}$;
Third layer (intermediate layer) $CoCr_{37}$;
Fourth layer (magnetic layer) $CoCr_{14}Pt_{10}B_{10}$; and
Fifth layer (overcoat) carbon.

Figure 6:
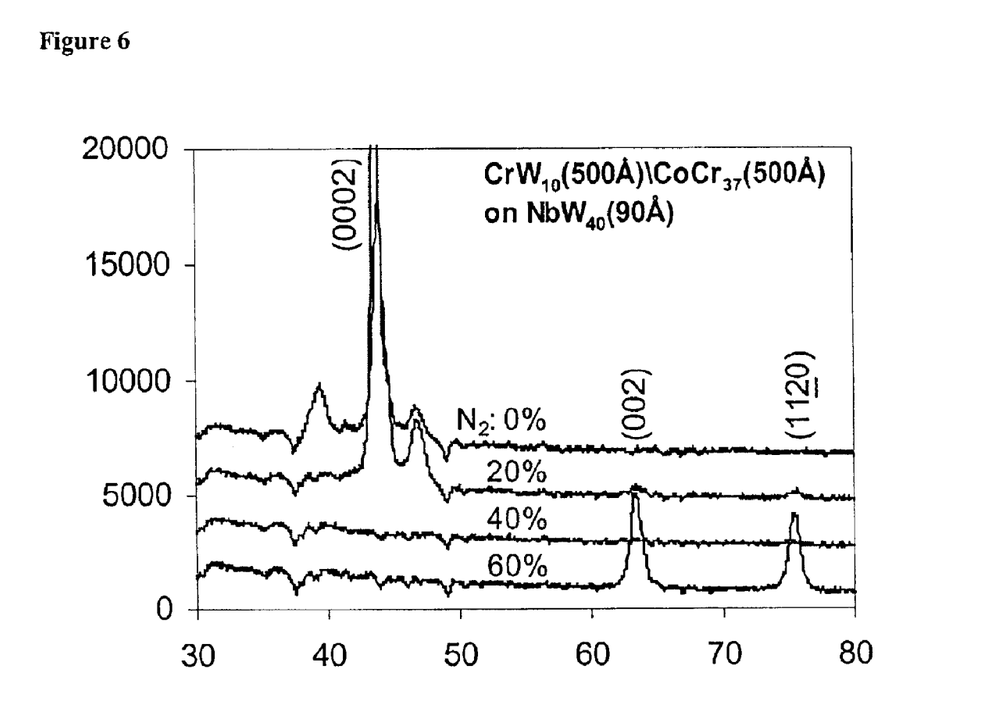
FIG. 6 shows the X-ray diffraction patterns of $CrW_{10}\backslash CoCr_{37}$ films with a 90 Å thick niobium tungsten alloy seedlayer deposited in the presence of various nitrogen/argon mixtures.

FIG. 6 shows XRD θ–2θ scans of $CrW_{10}\backslash CoCr_{37}$ films on 90 Å thick $NbW_{40}$ seedlayers sputtered with various volume percents of $N_2$ in the $N_2$/Ar gas mixture. The XRD suggests that a NbW seedlayer, if deposited in an appropriate $N_2$ and Ar gas mixture, can also enhance (002)(1 1 $\bar{2}$ 0) lamellar texture of the recording medium. The alloy addition allows the Nb alloy seedlayer to be optimized to achieve media with enhanced (002)\(1 1 $\bar{2}$ 0) texture with adjustable thickness and nitrogen content.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

What is claimed is:

1. A magnetic recording medium, comprising:
    a substrate,
    a niobium-containing seedlayer containing nitrogen having a thickness from about 1 Å to about 35 Å; and
    a magnetic layer, wherein the niobium-containing seedlayer further comprises a metal selected from the group consisting of boron, titanium, vanadium, chromium, zirconium, molybdenum, ruthenium, tantalum, and mixtures thereof.

2. The magnetic recording medium of claim 1, wherein the seedlayer comprises a thickness selected from the group consisting of a thickness from about 1 Å to about 30 Å, and a thickness from about 1 Å to about 20 Å.

3. The magnetic recording medium of claim 1, wherein the niobium-containing seed layer comprises a material selected from the group consisting of a material containing at least 80 atomic percent niobium, a material containing at least 50 atomic percent niobium, and a material containing at least 20 atomic percent niobium.

4. The magnetic recording medium of claim 3, wherein the niobium-containing seedlayer comprises at least 5 atomic percent nitrogen.

5. The magnetic recording medium of claim 1, wherein the niobium containing seedlayer contains a niobium:metal ratio from about 1:2 to about 20:1.

6. The magnetic recording medium of claim 1, wherein the niobium containing seedlayer is a niobium-nitride based material, $NbN_m$, wherein m is a number selected from the group consisting of from about 0.05 to about 2, and from about 0.05 to about 1.

7. The magnetic recording medium of claim 1, wherein the magnetic layer produces reflections corresponding to an enhanced lamellar texture of (002) and (1 1 $\bar{2}$0) in a x-ray spectrum.

8. The magnetic recording medium of claim 1, wherein the niobium-containing seedlayer is deposited in an environment comprising a gas, the gas being selected from the group consisting of nitrogen, argon, and mixtures thereof.

9. The magnetic recording medium of claim 1, wherein the magnetic recording medium has a remanent coercivity value selected from the group consisting of from about 3200 Oe to about 6000 Oe, from about 3600 Oe to about 5400 Oe, and from about 3800 Oe to about 5000 Oe.

10. The magnetic recording medium of claim 1, wherein the magnetic recording medium wherein the seedlayer produces a maximum remanent coercivity of the magnetic recording medium at a seedlayer thickness of 60 Å or less.

11. A method of making a magnetic recording medium comprising:
   depositing a niobium-containing seedlayer containing nitrogen on a substrate, wherein the seedlayer has a thickness from about 1 Å to about 35 Å; and
   depositing a magnetic layer, wherein the niobium-containing seedlayer further comprises a metal selected from the group consisting of boron, titanium, vanadium, chromium, zirconium, molybdenum, ruthenium, tantalum, and mixtures thereof.

12. The method of claim 11, wherein the seedlayer comprises a thickness selected from the group consisting of thickness from about 1 Å to about 30 Å, and a thickness from about 1 Å to about 20 Å.

13. The method of claim 11, wherein the niobium-containing seedlayer comprises a material selected from the group consisting of a material containing at least 80 atomic percent niobium, a material containing at least 50 atomic percent niobium, and a material containing at least 20 atomic percent niobium.

14. The method of claim 11, wherein the niobium containing seedlayer is a niobium-nitride based material, $NbN_m$, wherein m is a number selected from the group consisting of from about 0.05 to about 2, from about 0.05 to about 1.

15. The method of claim 11, wherein the niobium containing seedlayer contains a niobium:metal ratio from about 1:2 to about 20:1.

16. The method of claim 11, wherein the niobium-containing seedlayer is deposited in an environment comprising a gas, the gas selected from the group consisting of nitrogen, argon, and mixtures thereof.

17. The method of claim 16, wherein the deposition environment contains from 15% to 60% by volume nitrogen.

* * * * *